United States Patent [19]

Griffaton

[11] Patent Number: 4,978,834
[45] Date of Patent: Dec. 18, 1990

[54] METHOD AND APPARATUS FOR REMOTELY WELDING A BUSH INSIDE A TUBE, IN PARTICULAR IN A STEAM GENERATOR IN A NUCLEAR POWER STATION

[75] Inventor: Jacques Griffaton, Chalon-sur-Saone, France

[73] Assignee: Framatome, Courbevoie, France

[21] Appl. No.: 422,363

[22] Filed: Oct. 16, 1989

[30] Foreign Application Priority Data

Oct. 14, 1988 [FR] France .................................. 88 13602

[51] Int. Cl.$^5$ ............................................ B23K 26/00
[52] U.S. Cl. .............. 219/121.63; 219/121.64.121.78; 219/121.83; 376/260
[58] Field of Search ...................... 219/121.63, 121.64, 219/121.78, 121.61, 121.62, 121.83; 376/260

[56] References Cited

U.S. PATENT DOCUMENTS 4,694,136 9/1987 Kasner et al. ................... 219/121.64
4,827,098 5/1989 Kasner et al. .............. 219/121.83 X Primary Examiner—C. L. Albritton
Attorney, Agent, or Firm—Pollock, Vande Sande & Priddy

[57] ABSTRACT

A bush (M) is initially fixed inside a tube (T) which is fixed in a perforated plate (P) of a steam generator in a pressurized water nuclear power station, lining a damaged portion of the tube. A welding light beam is provided by a YAG laser and is conveyed by an optical fiber (F) to an optical cell (30, 37) which focuses the beam on the bush in order to weld it, the cell rotating about the fiber in order to form a circular weld fillet. The fiber is free to slide axially in order to improve focusing which is done to slide axially in order to improve focusing which is done by means of an adjustment beam provided by a hellium-neon laser, the beam running along the fiber in both directions.

6 Claims, 7 Drawing Sheets

FIG.5A
FIG.5B
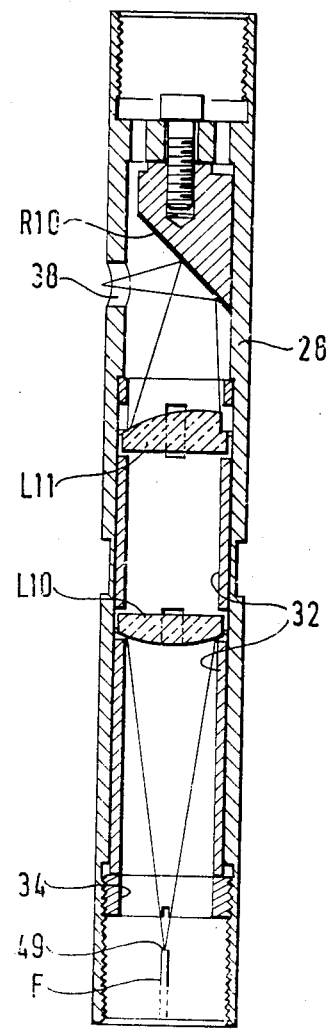
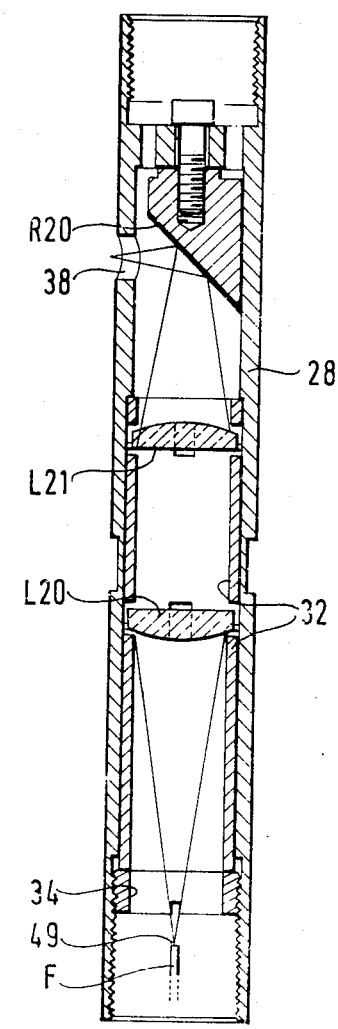

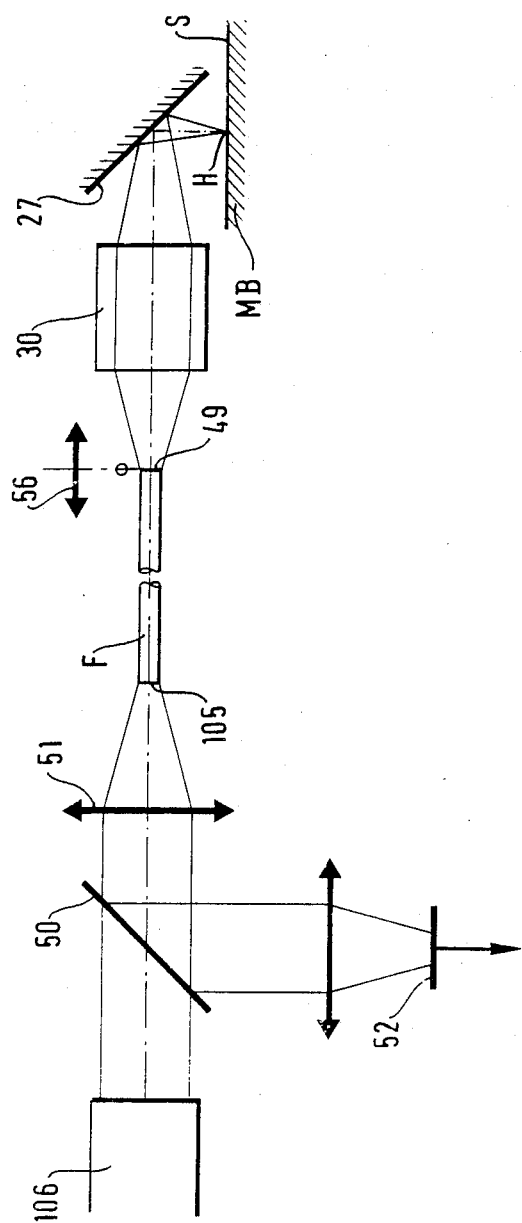

METHOD AND APPARATUS FOR REMOTELY WELDING A BUSH INSIDE A TUBE, IN PARTICULAR IN A STEAM GENERATOR IN A NUCLEAR POWER STATION

The invention relates to remotely welding a bush inside a tube. It is particularly applicable to repairing a leak in a steam generator tube in a pressurized water nuclear reactor.

The steam generators of such power stations generally comprise a bundle constituted by a very large number of small diameter tubes folded into U-shapes and fixed at each of their ends by being mounted in a very thick perforated plate. The portion of the steam generator situated beneath the perforated plate constitutes a water box in a first portion of which "primary" water under pressure coming from the reactor vessel is distributed amongst the tubes of the bundle. After flowing along the tubes, the water is recovered in a second portion thereof and is returned via a pipe of the reactor primary circuit to the vessel which contains the reactor core which is constituted by fuel assemblies for heating the pressurized water. The steam generator feed water comes into contact with the outside surfaces of the tubes in the bundle in a portion of the steam generator which is situated above the perforated plate, and is transformed into steam, which steam is delivered to the turbine associated with the nuclear reactor.

The walls of the tubes in the bundle thus constitute a barrier between the pressurized water constituting the primary fluid of the reactor and the feed water constituting the secondary fluid. The primary fluid which comes into contact with the fuel assemblies and with other structures inside the reactor vessel contains radioactive substances to a greater or lesser extent. It is therefore appropriate to avoid any direct contact between the primary fluid and the secondary fluid, since contamination of the secondary fluid could have highly damaging consequences. To make this possible, it is necessary to avoid leaks occurring through the walls of the tubes in the steam generator bundle of tubes, and in the event that such leaks do occur, it is necessary to repair tubes having leaky walls effectively and as quickly as possible.

Such repair work is generally required during the normal lifetime of the reactor. Stresses of thermal or mechanical origin or due to corrosion to which the tubes in the bundle are subject may give rise to cracks through the walls of the tubes in the bundle either in the primary side thereof or the secondary side. Repairs are performed during reactor downtime for maintenance purposes.

A known method of repairing the tubes in the bundle of a steam generator consists in bushing said tubes where they are leaking. A bush having an outside diameter which is slightly smaller than the inside diameter of the tube to be repaired and of sufficient length to cover the zone including a leak is inserted into the tube via the inlet face of the perforated plate at which the ends of the tubes are flush. The bush is placed so as to be flush with the inlet face of the perforated plate when inserted in a tube situated in the middle of the perforated plate, or so as to be halfway through the perforated plate when situated in a tube closer to the periphery thereof. The bush is then fixed inside the tube so as to provide two watertight connections between the bush and the tube, one on either side of the zone including the leak.

Numerous methods are known for fixing the bush on either side of the zone including a leak. In particular, the bush may be expanded diametrically in two zones close to its ends, with one of said zones lying within the thickness of the perforated plate and with the other of said zones being situated beyond the outlet face of the perforated plate, with this expansion being performed after the tube has been cleaned in both of said zones. Such expansion may be obtained either by hydraulic methods or by mechanical methods such as using a tube expander, or by expansion methods that make use of explosion, or by welding or soldering methods.

All of these operations require action to be performed from inside the water box of the steam generator, i.e. from inside a portion of the steam generator which has been in contact with primary fluid containing radioactive substances while the reactor was in operation, and this means that a human operator is subjected to a large dose of radioactivity.

Proposals have therefore been made to provide remotely controlled automatic devices capable of performing at least some of the operations required for bushing the tubes.

For example, one known method and apparatus for installing a bush inside a leaking steam generator tube from outside the water box are described in French patent application No. FR 2 598 209. The bush is inserted into the tube from outside the water box via a flexible tube referred to as a "boa" mounted on a double hydraulic expander which is used for the operation of docking inside the tube. After the two zones situated at the ends of the bush have been sufficiently expanded by inflating the elastic membranes of the double expander, the bush remains in position inside the tube.

The membranes are then decompressed and the expander is withdrawn from the bush. The same flexible tube is then used for inserting the fixing tools, i.e. the upper and lower tube expanders in succession into the bush respectively into its upper zone and then into its lower zone in order to fix the bush in place by tube expansion.

The drawback of this method is that it does not fix the bush in an absolutely leakproof manner.

In order to remedy this drawback, it is known that the bush can be fixed to the tube by being welded thereto at each of its ends.

U.S. Pat. No. 4 694 136 describes a device for performing such welding. This device comprises an optical weld head installed in the tube and a power laser situated outside the water box of the steam generator. The laser beam is transported by open air optical means from the laser situated outside the water box of the steam generator and the weld head.

This device requires a considerable amount of equipment to be implemented and installed in the vicinity of the steam generator including all the necessary supplies of fluids (electricity supply, cooling water supply). The power laser must be installed very close to the inspection hatch of the water box, which region is subjected to a level of radiation which is almost as high as that inside the water box. Attempts have been made to move the laser away from the inspection hatch, but this distance cannot be made very great without complicating aiming problems which rapidly become unsurmountable. Further, the weld head used suffers from a drawback related to the fact that the focal length is maintained constant and equal to the firing distance by an abutment having a ball and a spring bearing thereagainst: this system gives rise to friction, and to jolts and vibrations which reduce the quality of the welding.

In the particular application of the invention mentioned above, i.e. repairing a tube in the steam generator of a nuclear reactor, and in order to remedy the drawbacks enumerated above, the present invention provides a method enabling a bush to be welded in a steam generator tube by means of a source of energy which is situated at a very considerable distance from the steam generator, e.g. outside the reactor building in which it is contained. The invention also provides apparatus for implementing the method.

According to the method, the following operations are performed automatically under remote control from a control station situated, for example, outside the reactor building:

an optical weld head is inserted into the tube to be repaired after a bush has been fitted therein by a conventional method, said head is connected to a YAG type laser situated close to the control station, said connection being provided by a flexible tube containing an optical fiber for transporting light energy, an inert gas feed duct, and cables for transmitting control signals;

the weld head is positioned at a working level;

the focusing distance of the beam is adjusted; and a full circumference of the bush is welded in each of two zones on either side of the leaky zone of the tube.

The invention is now described, in order to facilitate understanding, with reference to the accompanying diagrammatic figures, in which:

FIGS. 5A and 5B are longitudinal sections through two variants of the optical cell of the apparatus;

FIG. 6 is a theoretical diagram showing how the focusing of the apparatus is adjusted.

Figure 1A:
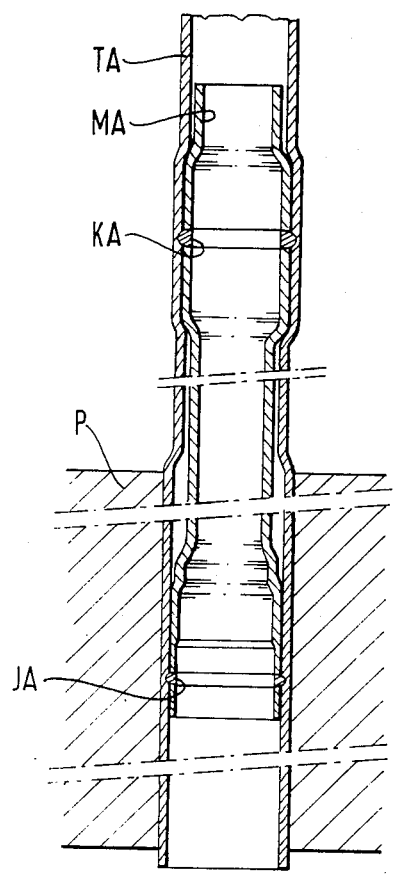
FIGS. 1A and 1B are longitudinal sections through two varieties of bush used for implementing the invention in the particular application mentioned above.

Regardless of whether the invention is applied to the particular circumstances mentioned above or to other circumstances, the following description refers to the above-listed figures purely by way of non-limiting illustration and begins by describing general arrangements, followed by more specific arrangements which appear to be the most characteristic of the method and apparatus of the invention.

This method and apparatus seek to make a connection firstly between a receiving tube (e.g. constituted by the tube to be repaired T) having an axis (A), and secondly a bush (M) to be welded and having a wall (S), said bush being previously put into position inside the tube.

Said method comprises:

an operation of inserting a weld head (4, 5, 6) into said receiver tube, said head including an optical cell which itself comprises:

optical reflection means (constituted by a mirror 37) suitable for receiving a welding light beam along said axis (A) of the receiver tube and for reflecting said beam towards the wall of said bush to be welded; and focusing means (30 constituted by lenses L1, L2, and L3, and an optical component 33) suitable for focusing said beam on an impact point (H) on the wall of said bush to be welded in such a manner as to weld said bush to said receiver tube at said point;

said method further including an operation of creating such a welding beam by means of a welding laser (104), said beam being suitable for performing said welding, said laser being situated in a beam creation zone (in a laser control station 102 and in a carrier control station 108) at a distance from said receiver tube; and a beam transport operation for bringing said welding beam to said optical cell via an inlet to said receiver tube.

Compared with the method described by U.S. Pat. No. 4 694 136 (Kasner), the method of the invention is characterized by the fact that said beam transport operation itself comprises:

an operation of placing an optical fiber to constitute a transport fiber (F) with the fiber being capable of bending to present an inlet (105) in said beam creation zone (102) and an outlet in said receiver tube on said axis (A) of said tube and facing said optical cell; and an operation of injecting the welding beam, during which operation said welding beam is injected into said inlet of said transport fiber so as to perform said welding.

The following sometimes-preferred arrangements may also be adopted:

Said method further includes an operation of rotating the impact point by rotating at least one of the optical reflection means (37) of said optical cell (30, 37) about said receiver tube axis (A) in order to cause said impact point (H) to describe at least an arc on said bush to be welded (M) so as to form a weld fillet, and said rotation of the optical reflection means (37) is driven by a motor (located in a motor assembly 2) situated outside said receiver tube (T) facing the inlet thereto and mechanically connected to said optical reflection means by a tubular extender assembly (constituted by a flexible sheath 19, a rigid end fitting 20, and a cylindrical piece 23), said assembly being disposed in said tube around said transport optical fiber (F) in such a manner as to avoid rotating said fiber.

Said extender assembly (19, 20, 23) includes a flexible sheath (19) with said assembly and/or said optical cell (30, 37) being guided by external centering means (constituted by a bearing 21 and a centering brush 42) having at least one moving bearing point on the wall (S) of said bush to be welded (M) and/or on said inside surface of the receiver tube (T), said transport fiber (F) being guided by an internal centering means (constituted by a bearing 26) bearing on said extender assembly at least one moving bearing point.

Said transport fiber (F) is guided by said internal centering means (26) so as to enable it not only to rotate but also to displace said fiber axially along said extender assembly (19, 20, 23), said assembly driving said optical cell (30, 37) axially, said method further including, after said operations of placing said weld head (4, 5, 6) and said transport fiber (F) and before said operation of injecting the welding beam into the inlet (105) of the transport fiber:

an operation of injecting an adjustment beam, during which operation an adjustment beam of lower power than said welding beam is injected into said inlet (105) of the transport fiber in such a manner as to be transported by said fiber and reflected and focused by said optical cell in order to illuminate said impact point (H), and to cause a light beam to be returned from said impact point to said inlet to the optical fiber; and a focus adjustment operation during which the intensity of said returned beam is measured and during which said transport fiber is displaced axially relative to said optical cell until an optimum position is reached in which said intensity reaches a maximum value and/or a predetermined value, said optimum position then being fixed.

Said weld head (4, 5, 6) is provided with flexible external centering means (constituted by a centering brush 42) in order to bear against the entire periphery of the wall (S) of said bush to be welded (M), said centering means being rotatably mounted to rotate freely relative to said head in order to allow said head to rotate without moving the centering means; and said focusing adjustment operation is performed with rotation of said weld head and with the variations in the intensity of said returned beam during said rotation being stored.

Apparatus in accordance with the invention comprises:

a welding laser (104) for creating a welding beam suitable for welding said bush to be welded inside said receiver tube (T);

a weld head (4, 5, 6) suitable for being put into place inside said receiver tube and provided with an optical cell, itself comprising:

optical reflection means (constituted by a mirror 37) for receiving a welding light beam along said axis (A) of the receiver tube and for reflecting said beam towards the wall of said bush to be welded; and focusing means (30 constituted by lenses L1, L2, and L3 and by an optical component 33) for focusing said beam on an impact point (H) on the wall of said bush to be welded in such a manner as to weld said bush to said receiver tube at said point;

and beam transport means for transporting said welding beam from said welding laser to said optical cell;

said apparatus being characterized by the fact that said beam transport means comprise:

a flexible optical fiber constituting a transport fiber (F) having an inlet (105) for receiving said welding beam provided by said welding laser (104) and also having an outlet (49); and internal centering means (26) for maintaining said outlet relative to said optical cell (30, 37) in such a manner as to ensure that said outlet is disposed on said axis (A) of the receiver tube (T) when said weld head (4, 5, 6) is placed in said tube.

The following, sometimes-preferred arrangements may also be adopted:

The apparatus comprises:

an adjustment laser (106) for injecting an adjustment beam which is lower powerful than said welding beam into said inlet (105) of the transport fiber (F) in such a manner that said impact point (H) is illuminated and a beam is returned from said point back to said inlet;

measurement means (constituted by a photosensitive receiver 52) for measuring the intensity of said returned beam; and axial positioning means (constituted by a clamp 13 and an adjusting ring 16) for driving said fiber outlet (49) in axial displacement relative to said optical cell (30, 37) in such a manner as to focus said adjustment and welding beams on said impact point (H);

said internal centering means (26) being selected to allow said axial displacement of the outlet of the transport fiber to take place.

The apparatus further comprises:

a motor (located in a motor assembly 2);

an extender assembly (constituted by a flexible sheath 19, the rigid end fitting 20, and the cylindrical piece 23) connecting said motor to said optical cell (30, 37) in order to rotate said cell about said axis (A) of the receiver tube in such a manner as to cause said impact point (H) to describe at least an arc in order to form a weld fillet, said extender assembly surrounding said transport fiber (F);

said internal centering means (26) bearing inside said extender assembly and enabling relative rotation to take place between said fiber and said assembly in such a manner as to ensure that said fiber is not rotated.

Said weld head (4, 5, 6) is provided with flexible external centering means (constituted by the centering brush 42) mounted free to rotate about said axis (A) of the receiver tube relative to said head in order to take up a friction abutment against said wall (S) of said bush to be welded and to remain stationary during said rotation of said optical cell (30, 37).

One particular implementation of the invention is now described for application of the method defined above, with the implementation including the arrangements mentioned above as being sometimes-preferred.

Figure 1B:
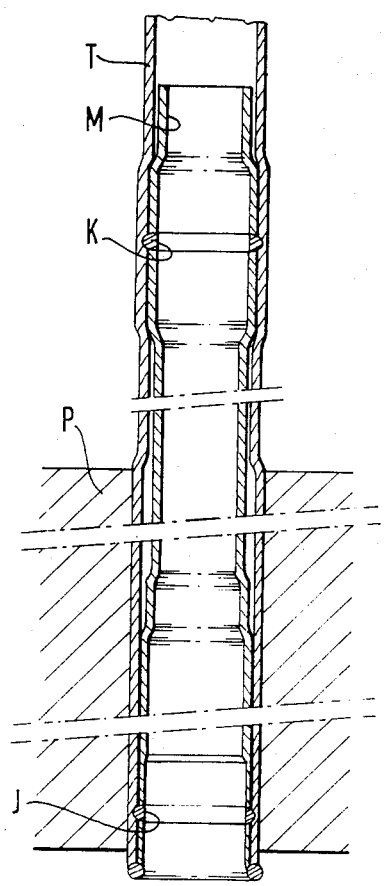

FIGS. 1A and 1B show two types of bush used for repairing steam generator tubes in a nuclear reactor:

FIG. 1A is an elevation section through a bush MA used for repairing tubes such as TA which are situated near the periphery of a perforated plate P, with a weld fillet JA constituting one connection; and FIG. 1B is an elevation section through a long bush used for repairing tubes situated in the middle portion of the perforated plate P (which amounts to 80% of the tubes), with the bottom connection J being located closer to the bottom face of the plate.

In both cases, the top connection KA or K is situated above the top face of the plate P, close to the top end of the bush.

Figure 2:
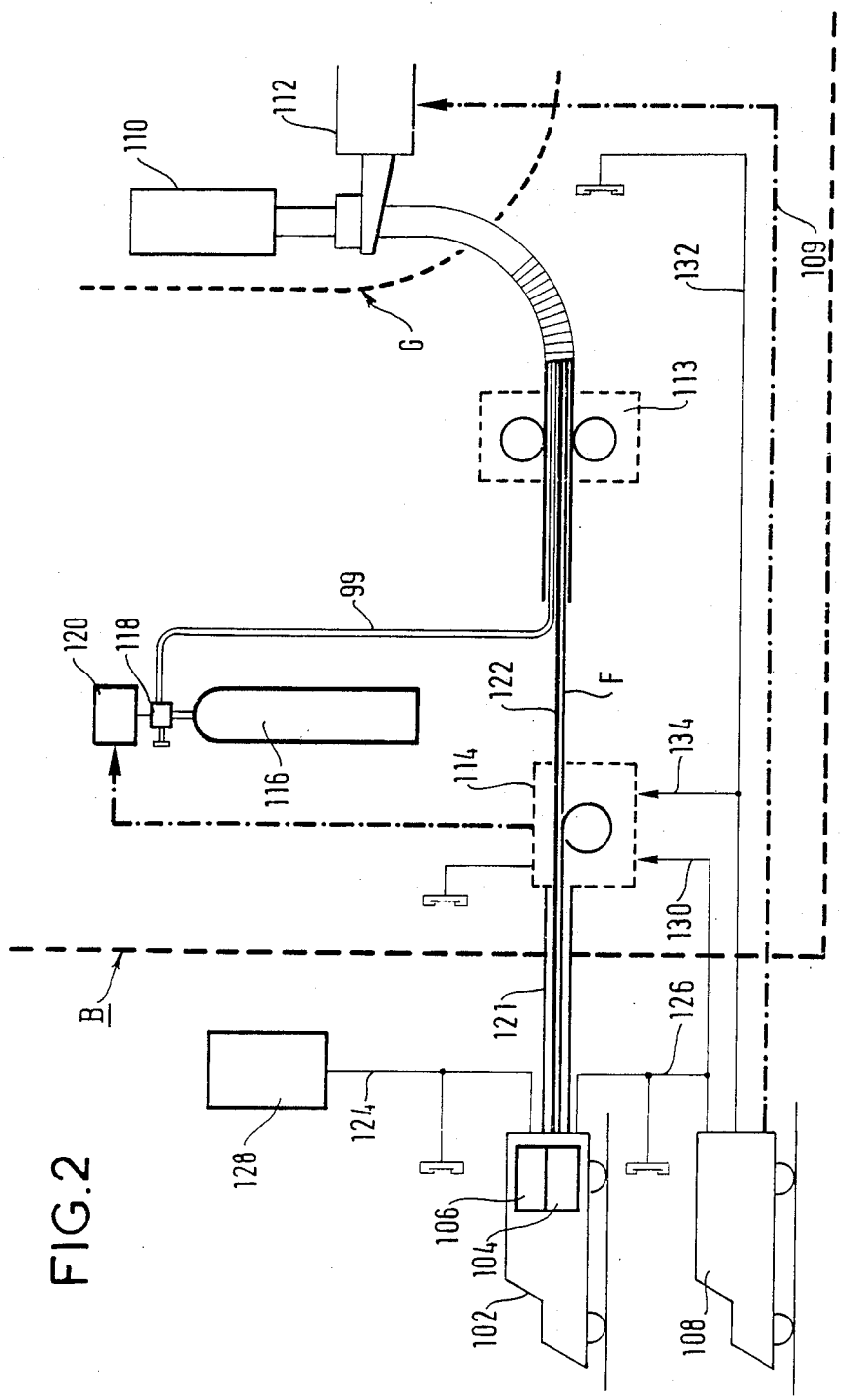
FIG. 2 is an overall view of apparatus for implementing the method in the same application.

FIG. 2 shows all of the items required for implementing the method and constituting the apparatus of the invention. These items comprise:

A mobile laser control station 102 situated outside the reactor building B. This station includes a YAG type welding laser 104, a helium-neon type adjusting laser 106 emitting visible light and coupled to the YAG laser, general electricity power supply connections, connections for cooling water, a control rack, and video monitor means. The welding laser used is preferably a neodymium doped YAG laser operating at a wavelength of 1.06 micrometers (µm) and having a power of 1.2 kW. However, it would be possible to use any other laser having a power of not less than 1,000 W and emitting at a wavelength which is not greater than said value, or for which there exists a transparent optical fiber.

A mobile carrier control station 108 situated by way of example outside the reactor building but which could be situated inside the building, for controlling a carrier 112. This station also includes a control rack, video monitor means, general electricity power supply connections, and connections 109 leading to the carrier for controlling it.

A terminal assembly 110 including a weld head. This assembly is carried at the end of an arm of the carrier 112 which is installed inside the water box G of the steam generator.

A push-pull device 113 located inside the reactor building in the vicinity of the steam generator.

A connection relay station 114 inside the reactor building.

A gas feed system including a cylinder 116, valves 118, and valve actuators 120.

And a flexible duct 121 connecting the laser control station 102 to the welding device via the connection relay station and the push-pull device. This duct contains cables 122 for transmitting control signals to the welding device and an optical fiber F for transmitting light energy from the lasers to the weld head contained in the terminal assembly 110. The optical fiber used is preferably a silica optical fiber. However any other fiber which is transparent to the electromagnetic spectrum emitted by the laser used may be appropriate insofar as its attenuation coefficient per kilometer remains about 10 dB and preferably 4 dB or less at the wavelength of the YAG laser.

Telecommunications cables 124, 126, 130, 132, and 134 also connect these various items to one another and to a telephone terminal 128.

Figure 3:
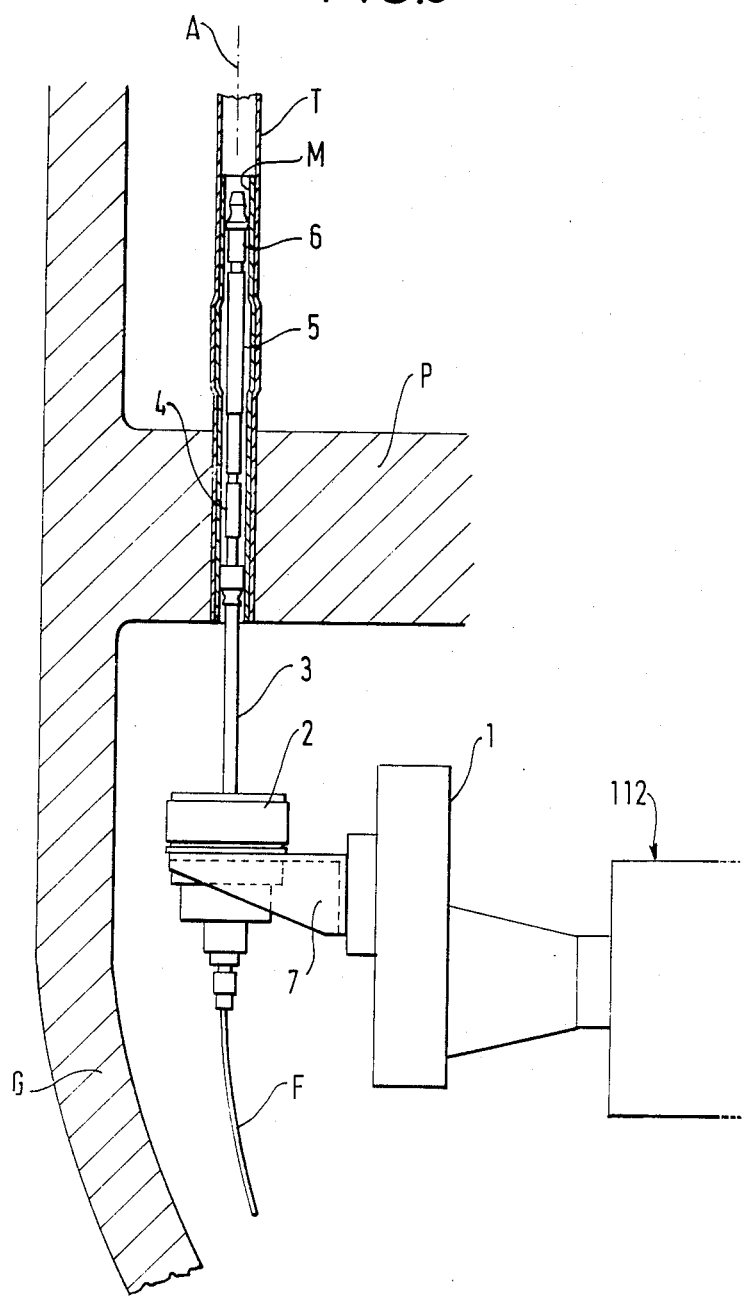
FIG. 3 is a longitudinal section through a portion of the welding apparatus and constituting a terminal portion thereof.

FIG. 3 shows the components of the terminal assembly 110. This assembly constitutes a portion of the welding apparatus which is installed inside the tube to be repaired T, or "receiver" tube, which has previously been fitted with a bush M to be welded in place. This assembly is shown in position for welding. It is fixed on an up/down elevator 1 at the end of the arm of the carrier 112, with the elevator being used for inserting and positioning the weld head inside the bush. The terminal assembly also includes a motor assembly 2 and the weld head, per se. The weld head is constituted by a flexible extension 3, a rigid extension 4, an optical cell 5, and a guide cone 6.

Figure 4:
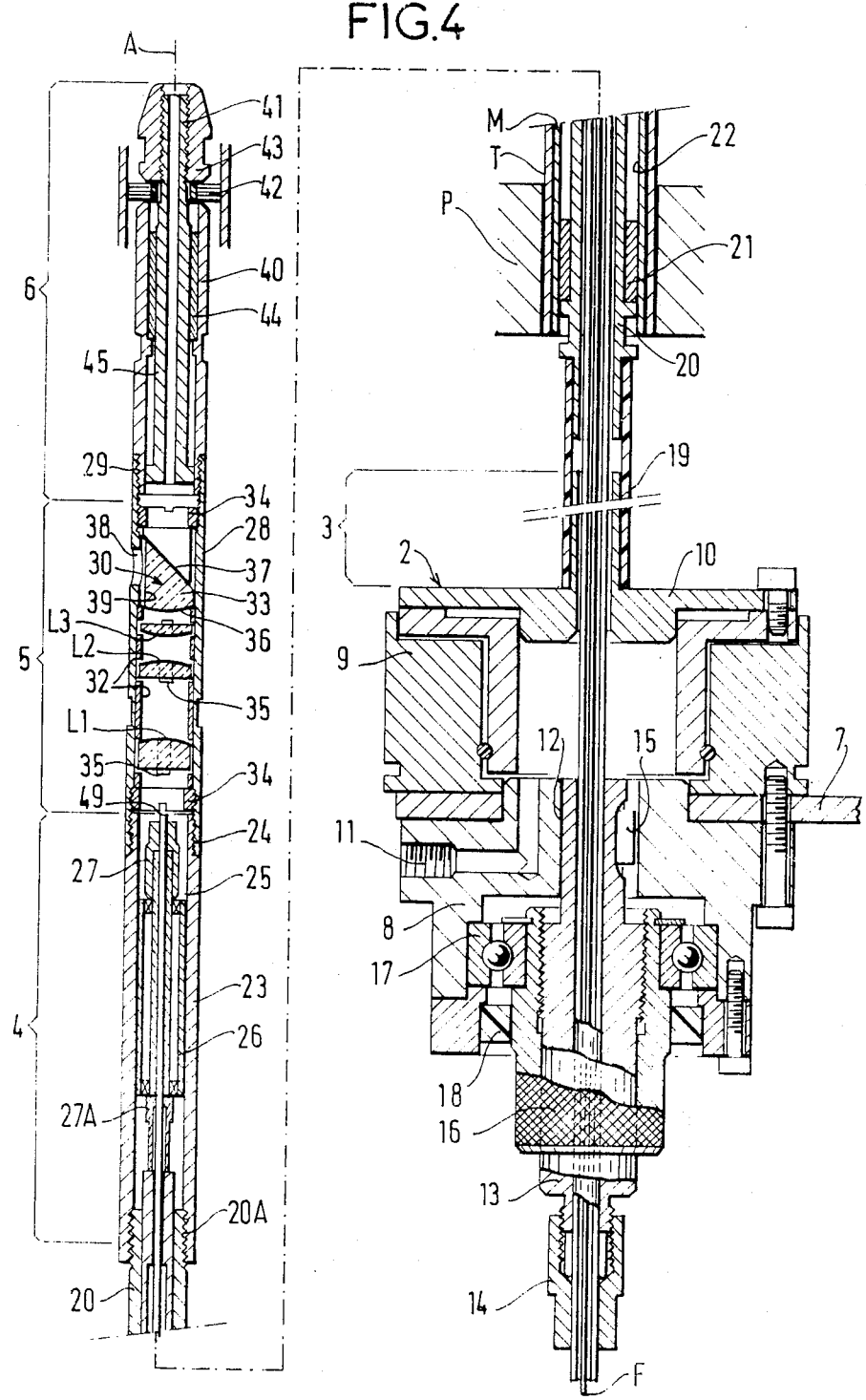
FIG. 4 is a longitudinal section on a larger scale through said terminal portion of the optical welding apparatus.

FIG. 4 is a longitudinal section through this assembly. The assembly 2 is fixed onto the elevator 1 by a bracket 7, and it includes a housing 8 and the base 9 of a turntable which are mounted coaxially. The base of the turntable is fixed and its rotary core 10 is crimped to the flexible extender 3. The housing 8 has a gas inlet channel 11 and a central bore 12. The optical fiber is locked in a clamp 13 by a nut 14. The clamp slides axially in the bore 12 and is prevented from rotating by a key 15. The axial position of the clamp relative to the housing is adjustable by means of a ring 16, thereby enabling the position of the end of the fiber to be adjusted relative to the weld head. It will thus be understood that an appropriate welding altitude is obtained by adjusting the position of the support bracket 7 by means of the elevator 1, and that axial adjustment of the relative position of the optical fiber relative to the housing is obtained by rotating the ring 16. This ring is mounted free to rotate inside the housing by a ball bearing 17. In the figure, it is represented by a manual version without servo-control. However, it is easily motorized (see FIG. 7). The ring mounting is sealed by an O-ring 18.

The flexible extender 3 comprises a length of flexible outer sheath 19 fitted at one end to the rotary core 10 of the turntable and having a rigid end fitting 20 at its other end with the rigid end fitting being terminated by a thread 20A for screwing into the rigid extender 4. A smooth bearing 21 is slidably mounted on the end fitting, with the outside diameter of the smooth bearing 21 being slightly smaller than the diameter of the bush M in the examples shown of bushing central tubes, or slightly smaller than the inside diameter of the receiver tube when bushing peripheral tubes. This bearing surface provides rotary guidance for the weld head. The end fitting has an internal bore 22 through which the optical fiber passes.

The rigid extender 4 is constituted by a cylindrical part 23 which is tapped at one end to co-operate with the thread 20A on the flexible extender, and whose other end is threaded at 24 in order to be fixed to the optical cell 5. This part has an internal bore 25 in which a bearing 26 is slidably mounted. This bearing is fixed to the optical fiber F. It is constituted by two ball bearings and a ring. The bearing serves to provide axial guidance for the optical fiber when it moves relative to the extender, and it also provides rotary guidance for the weld head assembly relative to the optical fiber. The end of the optical fiber is crimped in an end fitting 27 and in an abutment 27 which holds the ball bearings of the bearing assembly 26.

The optical cell 5 is constituted by a portion of tube 28 which is tapped at both ends at 24 and 29. The bottom tap 24 receives the rigid extender and the top tap 29 receives the cone. A stack 30 of lenses L1, L2, and L3, of spacers 32, and of an optical component 33 is mounted inside said tube and is fixed by two nuts 34. The lenses and the nuts are grooved at 35 along four generator lines at 90° intervals for the purpose of passing the gas which flows over the weld zone. The optical component 33 is constituted by a cylinder having a spherical face 36 and a plane mirror face 37 inclined at 45° to the axis A. The light beam enters it via its spherical face passing along the longitudinal axis and is reflected radially. On the reflected beam path, the tube has an opening 38. Level with said opening, the optical component has a groove 39 for allowing the gas flow to pass.

FIGS. 5A and 5B show two variant embodiment of the optical cell. FIG. 5A shows an embodiment having two lenses L10 and L11 with the second lens being offset in order to distance the plane mirror R10 from the focusing spot. FIG. 5B shows a minimum configuration having two lenses L20 and L21 together with a mirror R20. The preferred embodiment is the embodiment shown in FIG. 4.

The cone is constituted by a tube 40 whose bottom end is threaded for screwing into the optical cell. Inside the tube, there is a shaft 41 carrying a centering brush 42 which is held in place by a nose 43. This shaft slides in a bearing 44 which is a force-fit inside the tube 40. A projection 45 limits axial displacement of the shaft inside the tube.

During welding, the weld head constituted by the outer sheath of the flexible extender, the cylindrical piece 20, the rigid extender, the optical cell, and the guide cone tube performs a full turn through 360° under the drive of a motor (not shown) included in the motor assembly 2 and guided at its top end by the centering brush 42 and at its bottom end by the sliding bearing 21. These are the two bearing points against the inside surface of the bush M. During this rotation, the optical fiber remains fixed as does the shaft carrying the guide cone brush. If two or more slightly offset weld fillets are required, the weld head may be displaced longitudinally by virtue of the sliding bearings 21 and 43. The extenders and the weld head delimit a continuous annular space around the protective sheath 47 of the optical fiber. This space is interrupted by the ball bearings of the rigid extender and by the longitudinal grooves running past the nuts and the lenses. It allows gas to flow from the housing 8 and to flow over the weld.

FIG. 6 shows how the focusing distance of the beam 5 is adjusted on the inside surface of the bush. The optical head is inserted in a tubular adjustment jig MB having the same inside diameter as the bush to be welded. The helium-neon type adjusting laser 106 is then used and its visible light beam follows exactly the same path as the light from the welding laser. A separator plate 50 is installed at the outlet from the laser 106 prior to a converging lens 51 which concentrates light on the inlet 105 to the fiber F. This plate passes the light beam from the laser but reflects light leaving the fiber onto a photo-sensitive cell 52, said light coming from a light spot centered on the point H on the inside surface S of the jig MB and constituting a luminous object. If the axial position of the outlet end 49 of the optical fiber is varied along arrow 56 relative to the optical cell including the set of lenses 30 and the mirror 37, then the signal provided by the photo-sensitive cell 52 passes through a maximum position of the optical fiber which corresponds to the light being focused on the impact point H. In order to preadjust the position required for welding, the optimum position is looked for by acting on the ring 16 and this position is then stabilized by locking the ring in position, after taking account of the known offset in position between the focus of the HeNe beam and the focus of the YAG beam.

Figure 7:
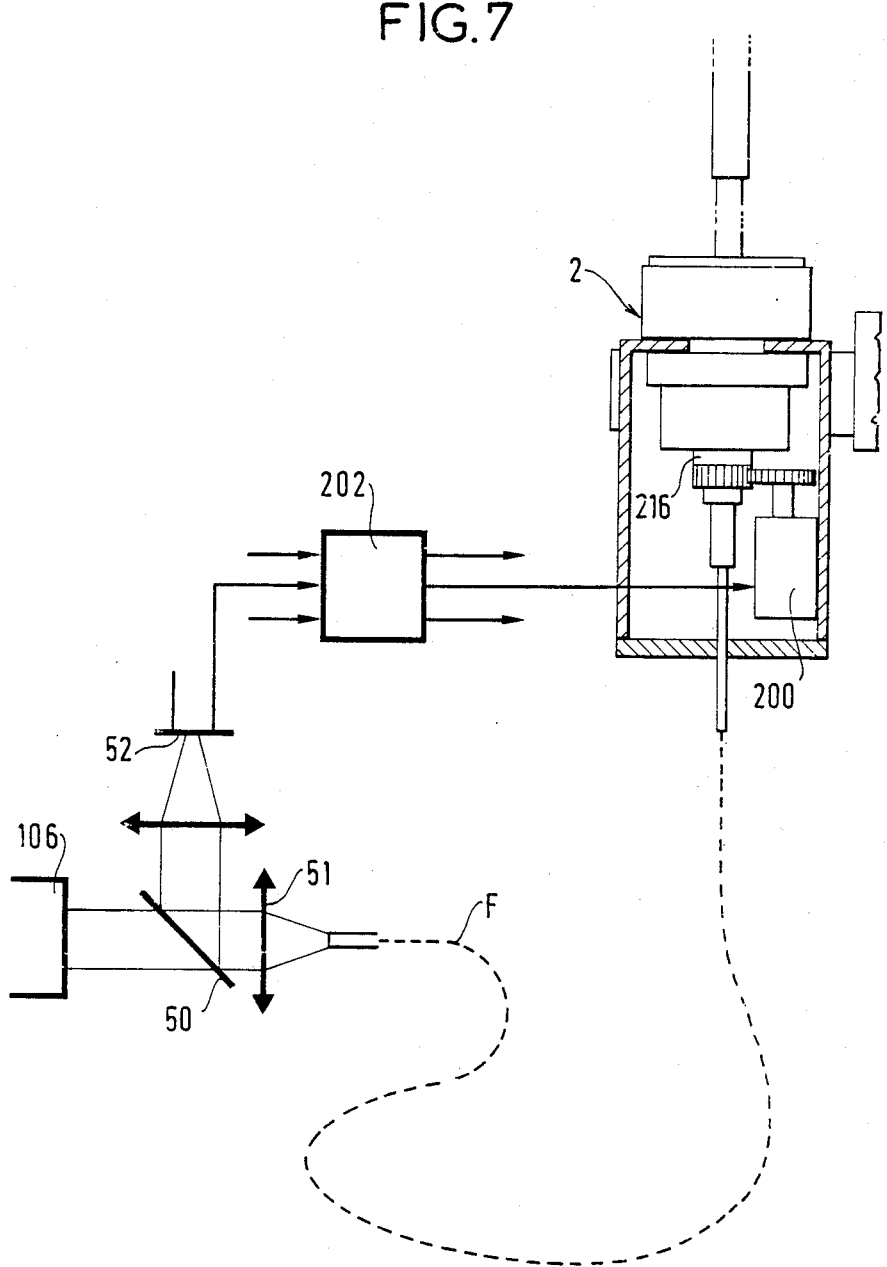
FIG. 7 is a fragmentary diagram of a modified welding apparatus in accordance with the invention in which focusing is adjusted automatically.

FIG. 7 shows a modified welding apparatus in which the optimum axial position of the optical fiber is obtained by automatically adjusting the position of a ring 216. This ring performs the same function as the ring 16 and it is driven by an adjustment motor 200 which is controlled from a data acquisition and handling center 202 after data has been acquired corresponding to a bush to be welded, with the remainder of the apparatus being unchanged. Such modification is compatible with the object of the invention since the above-described preadjustment of the position of the fiber for obtaining a minimum focus spot on the wall provides acceptable welding over a range of bush diameters of ±0.2 mm, which range corresponds to that encountered in practice for variation in bush diameter about a mean diameter after the bush has been expanded hydraulically. However, the value of the mean diameter varies from one tube to another which means that it is necessary to change the preadjustment for each bush in apparatus which has not been modified. The modified apparatus avoids the need for operator intervention for each tube. There are two stages: a data acquisition stage during which the center 202 causes the motor to rotate, and an adjustment stage during which the same center controls the adjustment motor 200. Data is acquired by recording the curve of the signal received by the photo-sensitive cell 52 during one complete revolution of the weld head, while a beam is being emitted by the laser 106. By virtue of the signal being calibrated, it is possible to deduce the average value of the diameter of the inside surface, after which the adjusting motor is actuated to position the optical fiber so that its focal length corresponds to the average value determined in this way.

The entire procedure for welding a bush inside a tube of a steam generator in need of repair using apparatus modified in the way described above, is now described. A laser control station 102 including a YAG laser 104 and a visible laser 106 is installed outside the reactor building of a nuclear power station together with a control station 108 for controlling a carrier 112 installed inside the water box of a steam generator G having leaky tubes such as T. Bushes such as M are docked in these tubes by a conventional method, ready to be welded into place. The carrier carries the terminal assembly 110 of the apparatus including the weld head which is connected to the laser control station by a flexible tube containing the optical fiber F and the signal transmission cables 124. This terminal assembly including the weld head is remotely inserted into the bush to be welded, the head is placed in its high position close to the top end of the bush by means of an elevator 1, a visible laser beam is applied to the optical cell 30, 37 and the curve representative of the distance between the axis A and the surface to be welded is traced over one revolution. The position of the optical fiber is then adjusted in order to obtain a minimum sized spot on the mean diameter as determined by the recorded distance curve, the welding laser beam is transmitted, and the bush is welded to the tube over one revolution. The elevator is then used to place the weld head in its low position close to the bottom end of the bush and a visible laser beam is applied to the optical cell so that the curve of the distance between the axis and the surface to be welded is recorded over one revolution. The position of the optical fiber is then adjusted in order to obtain a minimum sized spot on the mean diameter determined by the recorded distance curve, the welding laser beam is transmitted, and the bush is welded to the tube around one revolution.

Although the implementations of the invention described above relate only to one particular application, it will be understood that the invention is applicable to other applications, for example to repairing the tubes in a heat exchanger which is poorly accessible.

What is claimed is:

1. A method of remotely welding a bush in a tube, in particular in a steam generator of a nuclear power station, in order to make a connection firstly between a receiver tube having an axis, and secondly a bush to be welded which includes a wall and which has previously been installed in the tube, the method comprising:
   an operation of inserting a weld head into said receiver tube, said head including an optical cell which itself comprises:
      optical reflection means suitable for receiving a welding light beam along said axis of the receiver tube and for reflecting said beam towards the wall of said bush to be welded; and
      focusing means suitable for focusing said beam on an impact point on the wall of said bush to be welded in such a manner as to weld said bush to said receiver tube at said point;
   said method further comprising an operation of creating such a welding beam by means of a welding laser, said beam being suitable for performing said welding, said laser being situated in a beam creation zone at a distance from said receiver tube;
   an operation of placing a transport optical fiber for receiving said welding beam and for conveying it to said optical cell; and
   an operation of rotating the impact point by rotating at least one of the optical reflection means of said optical cell about said receiver tube axis in order to cause said impact point to describe at least an arc on said bush to be welded so as to form a weld fillet;

wherein said rotation of the optical reflection means is driven by a motor situated outside said receiver tube facing the inlet thereto and mechanically connected to said optical reflection means by a tubular extender assembly, said assembly being disposed in said tube around said transport optical fiber in such a manner as to avoid rotating said fiber.

2. A method according to claim 1, wherein said extender assembly includes a flexible sheath with said assembly and/or said optical cell being guided by external centering means having at least one moving bearing point on the wall of said bush to be welded and/or on said inside surface of the receiver tube, said transport fiber being guided by an internal centering means bearing on said extender assembly at at least one moving bearing point.

3. A method according to claim 2, wherein said transport fiber is guided by said internal centering means so as to enable it not only to rotate but also to displace said fiber axially along said extender assembly, said assembly driving said optical cell axially.

4. A method according to claim 1, in which said weld head is provided with flexible external centering means in order to bear against the entire periphery of the wall of said bush to be welded, and wherein said centering means are rotatably mounted to rotate freely relative to said head in order to allow said head to rotate without moving the centering means.

5. Apparatus for remotely welding a bush in a tube, in particular in a steam generator of a nuclear power station, in order to connect firstly a receiver tube having an axis and secondly a bush to be welded having a wall and previously put into place in said tube, said apparatus comprising:

a welding laser for creating a welding beam suitable for welding said bush to be welded inside said receiver tube;

a weld head suitable for being put into place inside said receiver tube and provided with an optical cell, itself comprising:

optical reflection means for receiving a welding light beam along said axis of the receiver tube and for reflecting said beam towards the wall of said bush to be welded; and focusing means for focusing said beam on an impact point on the wall of said bush to be welded in such a manner as to weld said bush to said receiver tube at said point;

said apparatus further comprising:

a flexible optical fiber constituting a transport fiber having an inlet for receiving said welding beam provided by said welding laser and also having an outlet; and internal centering means for maintaining said outlet relative to said optical cell in such a manner as to ensure that said outlet is disposed on said axis of the receiver tube when said weld head is placed in said tube;

wherein the apparatus further comprises:

a motor that remains outside said receiver tube;

an extender assembly connecting said motor to said optical cell in order to rotate said cell about said axis of the receiver tube in such a manner as to cause said impact point to describe at least an arc in order to form a weld fillet, said extender assembly surrounding said transport fiber;

said internal centering means bearing inside said extender assembly and enabling relative rotation to take place between said fiber and said assembly in such a manner as to ensure that said fiber is not rotated.

6. Apparatus according to claim 5, wherein said weld head is provided with flexible external centering means mounted free to rotate about said axis of the receiver tube relative to said head in order to take up a friction abutment against said wall of said bush to be welded and to remain stationary during said rotation of said optical cell.

* * * * *